United States Patent [19]
Bell et al.

[11] Patent Number: 5,265,508
[45] Date of Patent: Nov. 30, 1993

[54] ULTRASONIC CUTTING SYSTEM FOR STOCK MATERIAL

[75] Inventors: Jehu R. Bell, Doylestown; Dean W. Hazelton, Uniontown; James E. Brown; Gene E. Dodson, both of Akron; Gary W. Harter, Wadsworth, all of Ohio

[73] Assignee: General Tire, Inc., Akron, Ohio

[21] Appl. No.: 606,715

[22] Filed: Oct. 31, 1990

[51] Int. Cl.$^5$ .................... B26D 3/02; B26D 7/01
[52] U.S. Cl. ........................ 83/136; 83/282; 83/451; 83/614; 83/701
[58] Field of Search ............... 156/73.3, 406.4, 508.1, 156/508.2; 83/13, 56, 136, 102.1, 282, 614, 701, 451

[56] References Cited

U.S. PATENT DOCUMENTS

| | | | |
|---|---|---|---|
| 3,246,551 | 4/1966 | George | 83/282 |
| 4,516,451 | 5/1985 | Takeshita et al. | 83/614 |
| 4,567,797 | 2/1986 | Folk | 83/13 |
| 4,611,517 | 9/1986 | Schmale | 83/102.1 |
| 4,623,420 | 11/1986 | Hinkley | 156/515 |
| 4,711,693 | 12/1987 | Holze, Jr. | 156/508.1 |
| 4,781,094 | 11/1988 | Moretti | 83/614 |
| 4,792,372 | 12/1988 | Alexander et al. | 156/580.1 |
| 4,858,505 | 8/1989 | Still et al. | 83/614 |
| 4,922,774 | 5/1990 | Oldeman | 83/701 |
| 4,979,411 | 12/1990 | Murasaki et al. | 83/701 |
| 5,007,315 | 4/1991 | Alexander et al. | 83/614 |

FOREIGN PATENT DOCUMENTS 0284761 5/1988 European Pat. Off. .
9003873 4/1990 Fed. Rep. of Germany .

*Primary Examiner*—Hien H. Phan
*Attorney, Agent, or Firm*—Calfee, Halter & Griswold

[57] ABSTRACT

An ultrasonic cutting system for stock material temporarily bonds the stock material to an anvil incorporated in a processing table and cuts the stock material at a low angle with an ultrasonic cutting tool. The ultrasonic cutting tool is mounted on a carriage assembly which traverses the width of the stock material. The ultrasonic cutting tool includes a cutting blade mechanically coupled thereto. The cutting blade resonates in response to ultrasonic energy travelling axially therealong. As the carriage assembly moves across the stock material, the stock material is first adhesively bonded or secured to the anvil by at least two rollers. The rollers are mounted on the carriage assembly at a position slightly ahead of the cutting blade. The rollers apply pressure in a downward direction on the stock material to temporarily bond the material to the anvil and to prevent it from moving or vibrating during the cutting process. As the carriage assembly moves across the stock material, the blade cuts through the stock material at a low angle, preferably at an angle of about 5° to 10° with respect to the horizontal. After the blade has cut through the stock material, a trailing shoe, slidably moving along a channel guide formed in the anvil, removes the stock material from its adhesive bond with the anvil and allows the cut portion of the stock material to be removed for further assembly and processing into a tire.

22 Claims, 14 Drawing Sheets

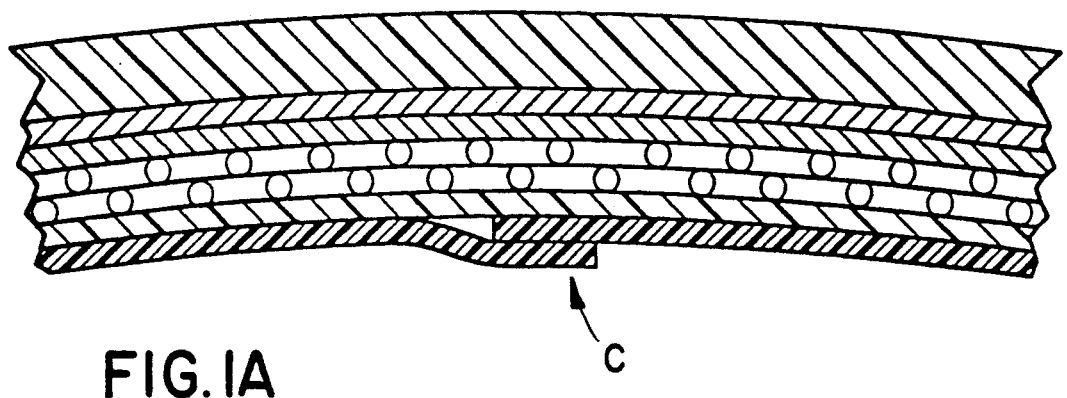
FIG. IA
PRIOR ART
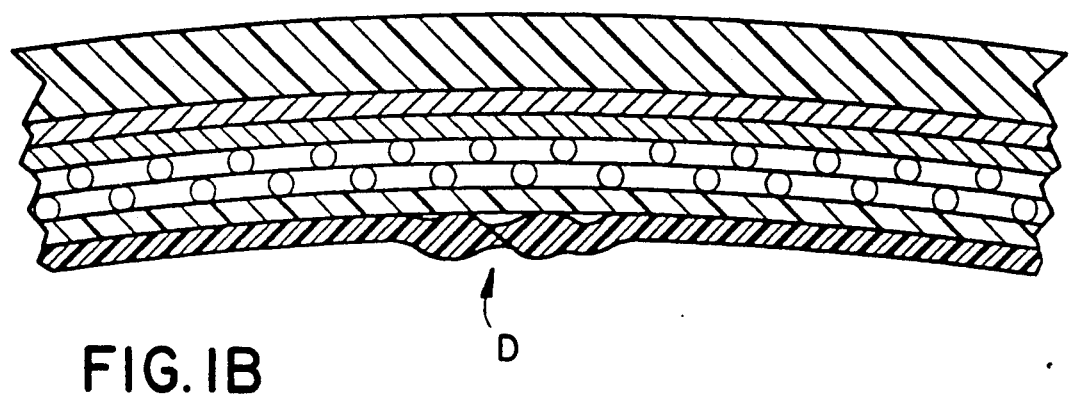
FIG. IB
PRIOR ART
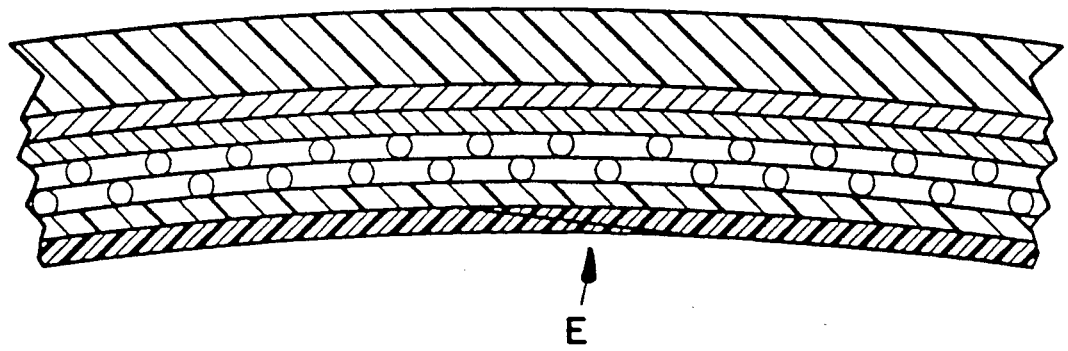
FIG. IC

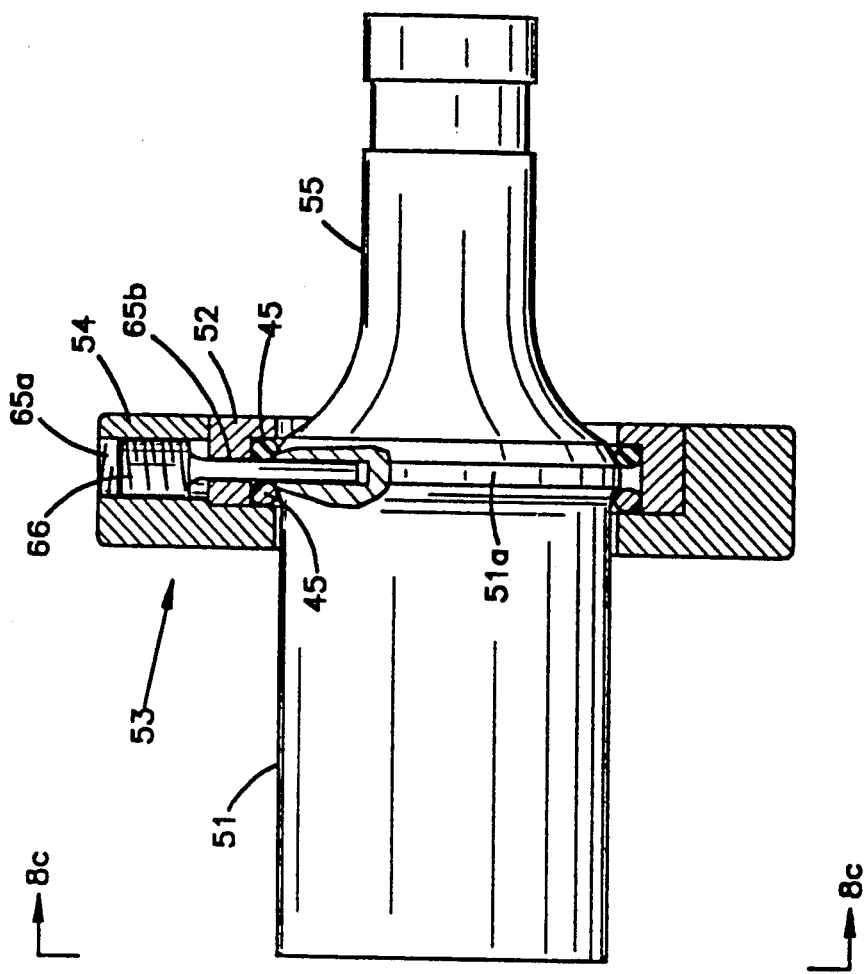
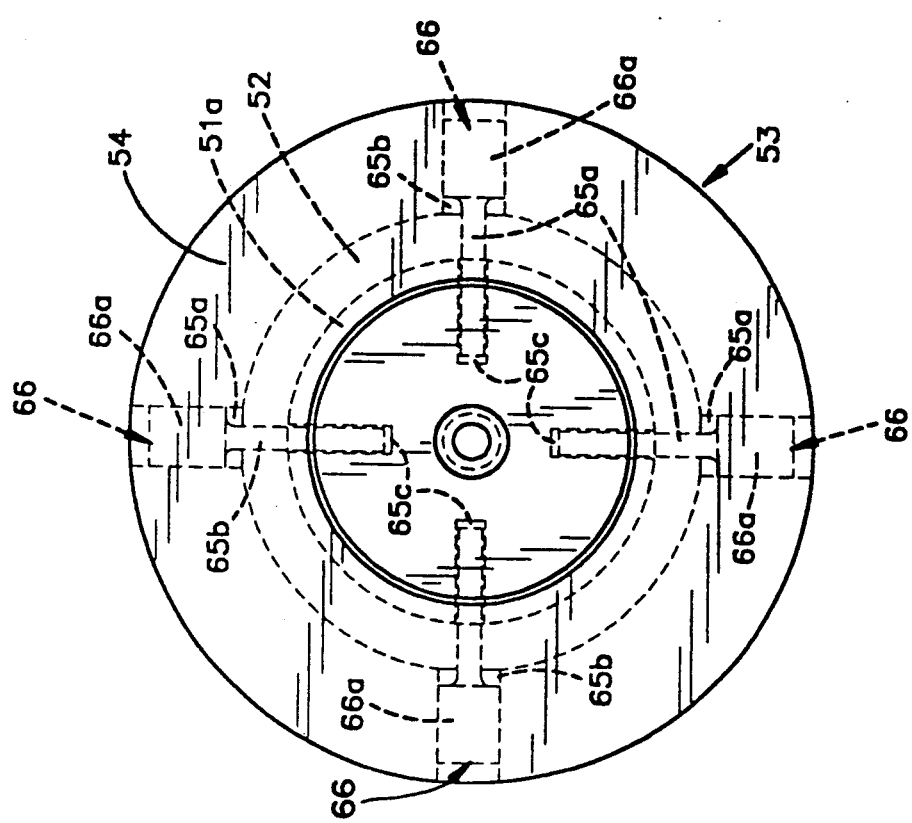
FIG.8B
FIG.8C

ULTRASONIC CUTTING SYSTEM FOR STOCK MATERIAL

FIELD OF THE INVENTION

The present invention relates to an ultrasonic cutting system for stock material, and in particular to an ultrasonic cutting system employing a blade adapted to ultrasonically cut tire stock material at a low angle.

BACKGROUND

A tire typically includes plies of various types, including, for example, an inner ply. These plies may be formed from a long sheet of rubber stock material by cutting the stock material to appropriate lengths and folding the end portions together to form a generally annular shape adapted to become part of a tire carcass. The two end portions of the stock material are typically overlapped a small amount and may be bonded together, for example, by adhesively bonding, or "stitching" the end portions together under pressure. The overlap of the ply ends results in a limited circumferential portion of these plies having a slight radial buildup, which cannot be avoided with known cutting techniques.

Currently, when a sufficient length of stock material has been prepared for cutting, the stock material is supported on a processing table and the blade is forced into the material. The blade is moved across the width of the stock material to cut off the desired length of material. The stock material is typically formed from rubber based products which are flexible and "sticky" to the touch. When the stock material is being cut with a conventional blade, the material tends to move or vibrate as the blade traverses the material, thereby increasing the cutting time and decreasing the quality of the cut. Moreover, the blade must cut the stock material at an angle substantially perpendicular to the processing table, or the stock material will tend to bunch up in front of the blade. The perpendicular angle of cut results in a cut edge having a reduced surface area, thereby making it difficult to splice the cut surfaces to one another in the tire building process. Consequently, it is necessary to overlap the ply end portions a small amount and adhesively bond or "stitch" them together under pressure.

Other cutting techniques are generally known but have not been successfully applied to stock material cutting. For example, ultrasonic cutting has been used for cutting textile material as shown in U.S. Pat. No. 4,711,693 issued to Holze, Jr. The Holze patent shows an anvil comprising an elongated, substantially rectangular housing in which a piston is disposed for motion relative to the housing. The anvil includes a slitting implement advanced by the piston. The textile material is fed through the nip between the slitting implement and ultrasonic horn. The ultrasonic horn is undergoing vibratory motion to cut the textile material held thereagainst.

Additionally, it is known that attempts have been made to cut tire sidewall material with a conventional blade at angles as small as 23° with respect to the horizontal, and then splice the cut ends together with a bevel lap splice. However, it has been found that a bevel lap splice of 23° or more in a sidewall does not adhere well without additional glues or adhesives and can become separated under normal tire operating conditions.

SUMMARY OF THE INVENTION

The present invention relates to an ultrasonic cutting system having a blade adapted to ultrasonically cut stock material at a low angle. An ultrasonic cutting system according to the present invention comprises a processing table, a carriage assembly adapted to move transversely across the width of the processing table, and an ultrasonic cutting tool mounted on the carriage assembly.

The processing table has an anvil incorporated therein. According to one aspect of the invention, the anvil comprises two parallel strips of plastic or Lexan material mounted on a beam or base. The parallel strips extend across the width of the anvil and define a guide channel therebetween for slidably receiving and guiding part of the carriage assembly.

The carriage assembly of the ultrasonic cutting system is adapted to move transversely across the anvil on two stationery parallel rods positioned above the anvil. The rods respectively are received in and pass through bearing blocks, which are part of the main carriage body of the carriage assembly.

The carriage assembly also includes a set of rollers which are mounted on the distal ends of arms extending downwardly from the carriage body. The set of rollers includes a first and second roller, wherein the second roller is located between the blade and the first roller. The rollers are adapted to travel ahead of the blade as the carriage traverses the stock material, with the first roller leading the second roller. The two rollers apply a predetermined amount of downwardly directed pressure on the stock material to removably bond or "stitch" the stock material to the anvil positioned therebelow.

The carriage assembly includes an ultrasonic cutting apparatus having a transducer and a cutting blade. The transducer and blade are mounted toward the side of the carriage body and extend at an angle downwardly therefrom. The cutting apparatus is part of, and moves concurrently with, the carriage assembly as it traverses the stock material. The transducer produces ultrasonic energy which is applied to the blade to create compression waves axially therealong.

The ultrasonic cutting apparatus is mounted on the carriage such that the blade extends at a low angle, preferably at an angle of about 5° to 10° with respect to the horizontal. The blade is also offset forwardly from the carriage assembly at an angle of approximately 15° relative to a normal or transverse plane across the carriage assembly. The low angle of the blade creates a beveled cut having a width of between about 1.00 cm and 2.88 cm. When the blade is brought into contact with the stock material, the oscillating blade cuts cleanly through the material.

The carriage assembly may further include a substantially L-shaped shoe extending downwardly therefrom. The shoe travels behind the blade when the carriage is moving across the anvil, and is adapted to lift and remove the cut portion of the stock material from the anvil. The bottom portion of the shoe includes a downwardly extending guide projection slidably received in the anvil guide channel to maintain the alignment of the carriage assembly with the anvil and processing table.

By providing an ultrasonic cutting system that uses ultrasonic energy to cut stock material, a low angle cut of the stock material can be achieved. The low angle cut results in a cut edge having an increased and "tacky"

surface area, which facilitates splicing the cut surface of the stock material together with a bevel lap splice without using additional glues or adhesives. The bevel lap splice provides for a substantially seamless bond of the stock material and eliminates radial build-up along the seam. Moreover, the bevel lap splice improves the balance of the tire and reduces both the radial forces on the splice and the tire cure time. Additionally, the material savings in eliminating the end ply overlap reduces the overall cost of the tire.

Further objects and advantages of the present invention will become apparent from the following detailed description and accompanying drawings.

BRIEF DESCRIPTION OF THE DRAWINGS

In the drawings:

FIG. 1A is a cross-sectional side view of the overlap splice of a prior art tire;

FIG. 1B is a cross-sectional side view of the crush-cut splice of a prior art tire;

FIG. 1C is a cross-sectional side perspective view of the low angle bevel lap splice provided by the present invention;

FIG. 8B is a detailed side view partially in section of the cutting apparatus, similar to but enlarged from FIG. 8A, having the housing removed for clarity;

FIG. 8C is an end elevation of the cutting apparatus taken along the plane 8C—8C of FIG. 8B;

DETAILED DESCRIPTION OF THE PREFERRED EMBODIMENT

Figure 1:
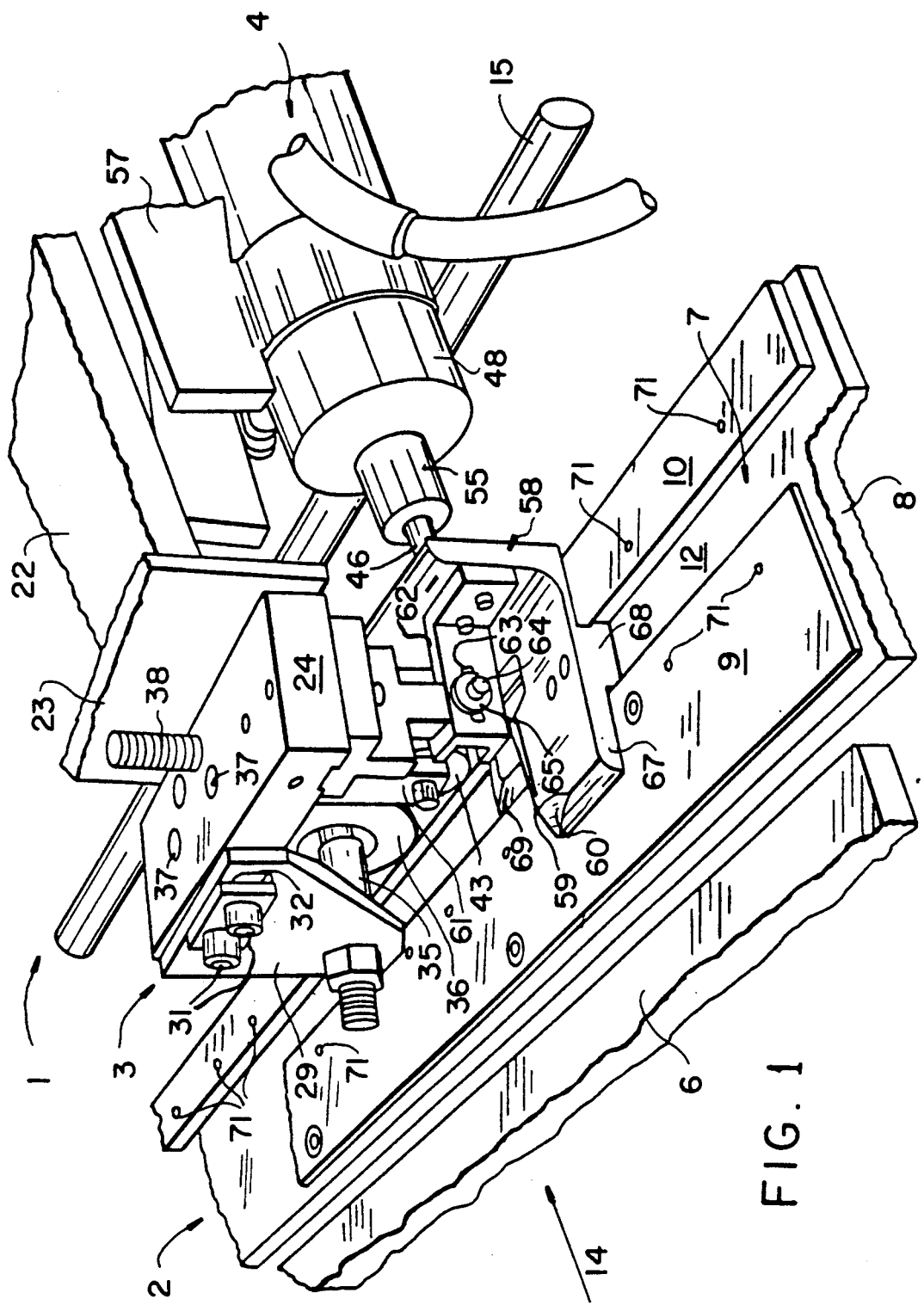
FIG. 1 is a diagonal upstream perspective of the ultrasonic cutting system constructed according to the present invention, with the stock material and rod support structure being omitted for clarity of illustration.
Figure 2:
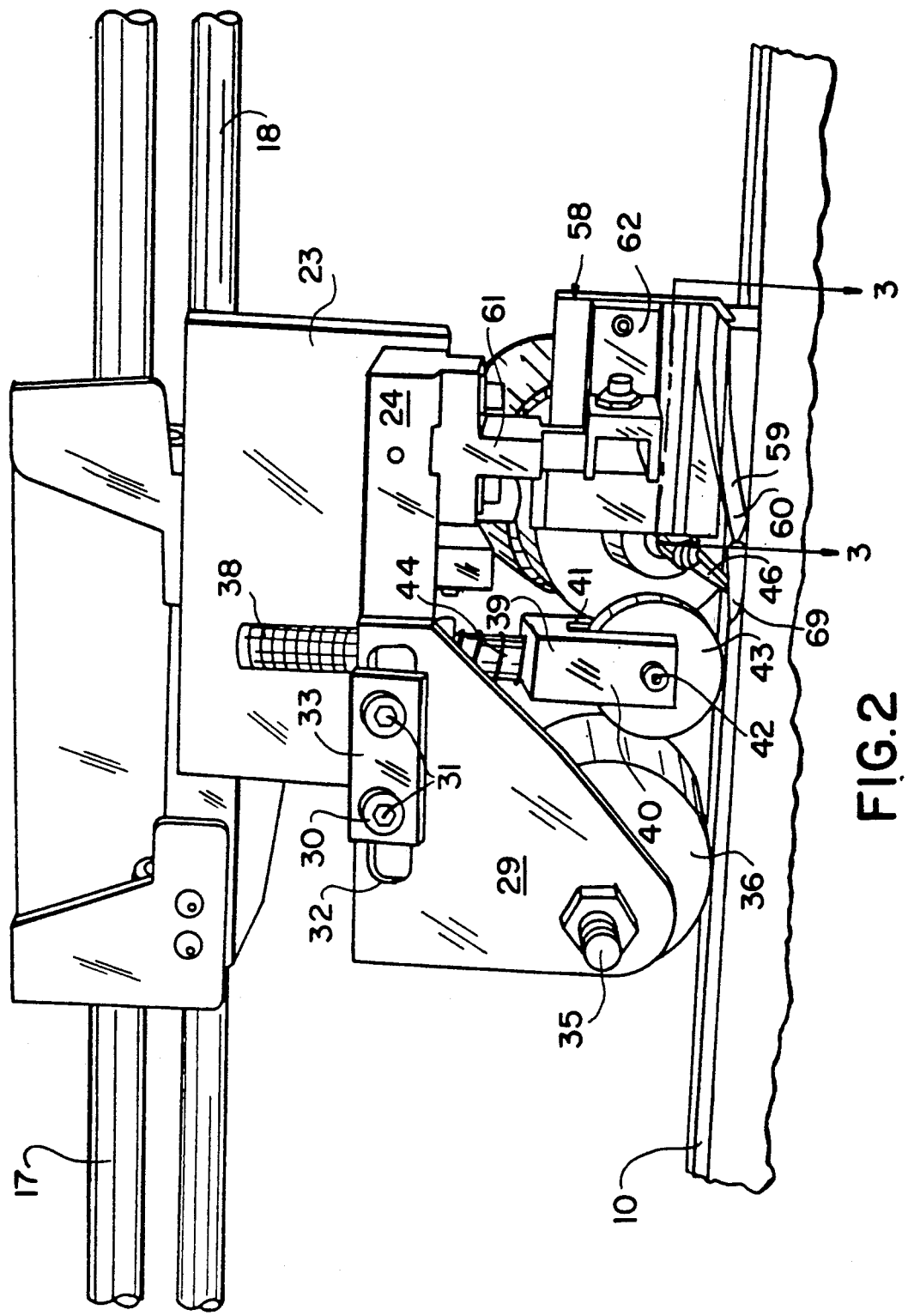
FIG. 2 is a side, upstream perspective view of the ultrasonic cutting system.
Figure 5:
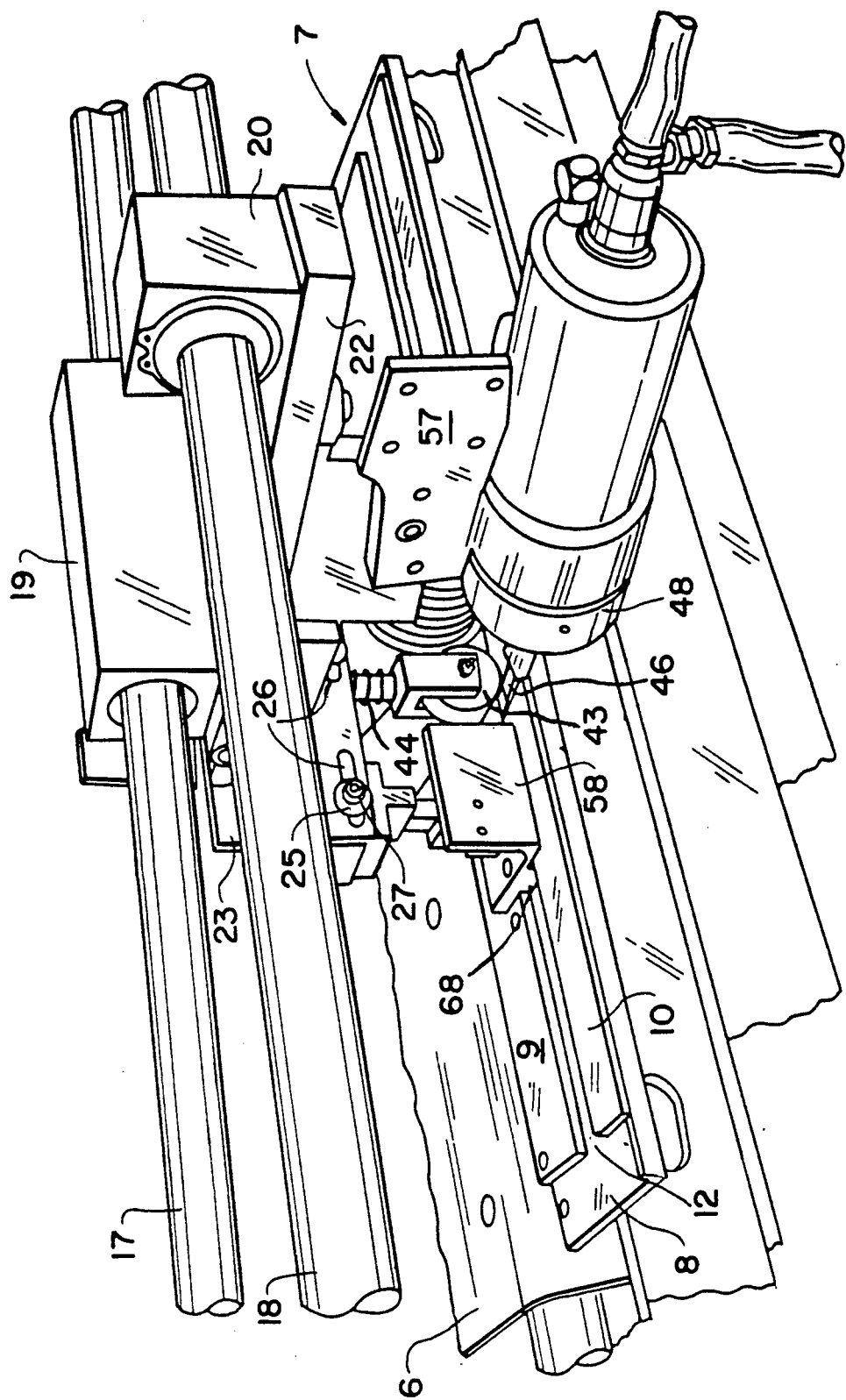
FIG. 5 is a diagonal downstream perspective of the ultrasonic cutting system.

As described above, the present invention relates to an ultrasonic cutting system, indicated generally at 1, having an ultrasonically energized blade adapted to cut stock material at a low angle. As shown in FIGS. 1, 2 and 5, an ultrasonic cutting system 1 according to the prevent invention comprises a processing table, indicated generally at 2, a carriage assembly adapted to move transversely across the width of the processing table, indicated generally at 3, and an ultrasonic cutting tool mounted on the carriage assembly, indicated generally at 4.

The processing table 2 of the cutting system is normally located in a stock material processing line. The processing table 2 supports the stock material as it is fed from the stock material supply through the cutting station. At the cutting station, the stock material is cut into lengths, which are then formed into a tire ply for incorporation into a green tire as it is being built.

As shown in FIG. 1, the processing table 2 includes a feed table 6 and an anvil, indicating generally at 7, mounted in end to end relationship to one another. In one embodiment, the anvil 7 includes a base 8, a front strip 9 and a back strip 10 of plastic or Lexan material. These parallel strips 9, 10 extend across the width of the base 8 and are secured to the top of the base 8 by screws or other conventional means. The parallel strips extend across the anvil 7 in close proximity to one another to form a guide channel therebetween, as shown at 12. The top surfaces of strips 9 and 10 preferably lie in a common plane with the top surface of feed table 6.

Figure 7:
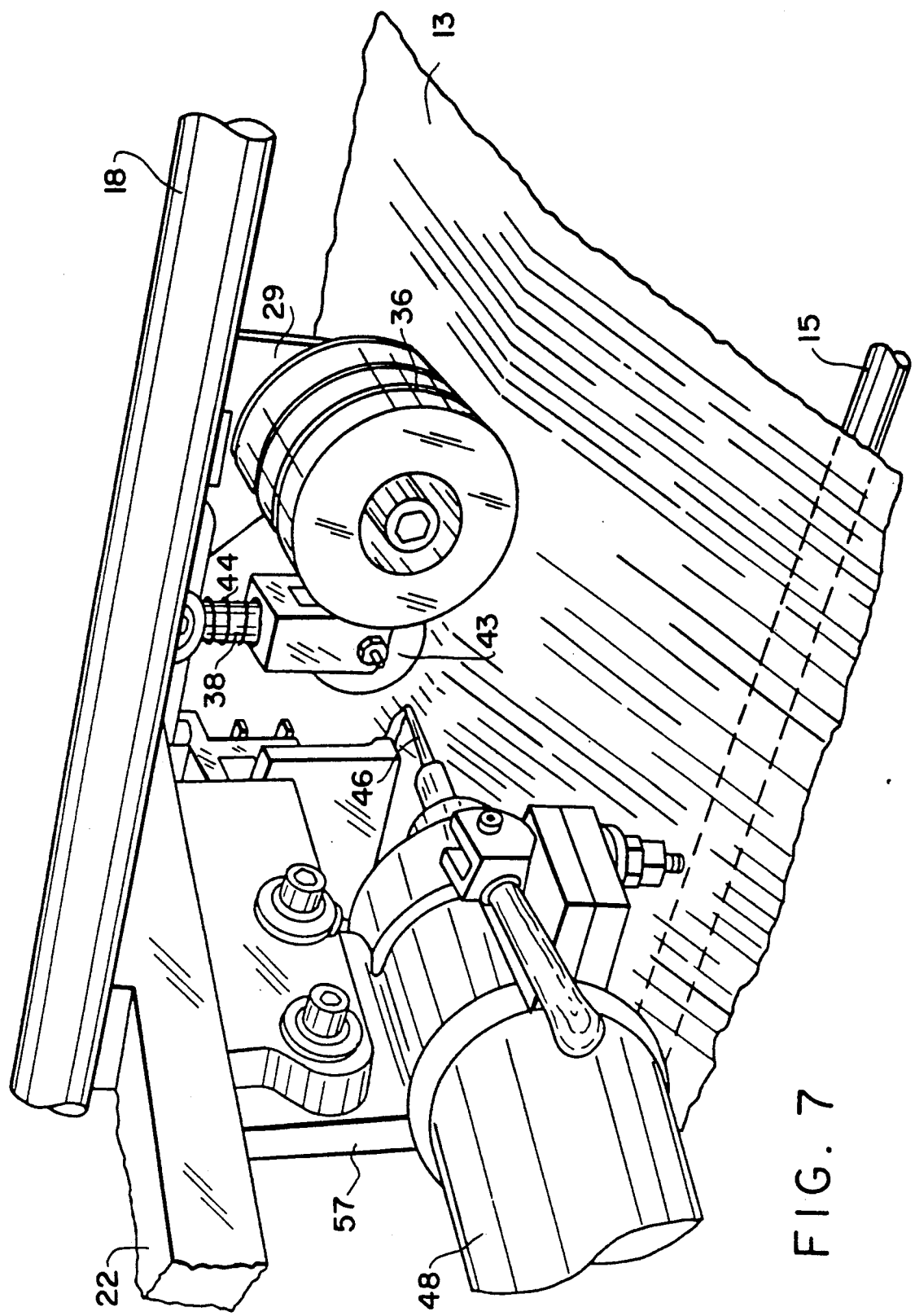
FIG. 7 is a diagonal downstream perspective of the ultrasonic cutting system taken from a different angle, showing the blade ultrasonically cutting the stock material.

The feed table 6 may include a conveyor for automatically advancing stock material 13 to the anvil at the cutting station. The stock material 13 is advanced in the longitudinal direction of arrow 14, with the term "upstream" meaning to the left of the cutting station, and the term "downstream" meaning to the right of the cutting station, as viewed in FIG. 1. The stock material 13 downstream of the cutting station may be supported by a rotatable shaft 15 as shown in FIG. 7, or by a downstream, run-out table (not shown). The shaft 15 or run-out table form part of the overall processing table.

As shown best in FIG. 5, the carriage assembly 3 of the ultrasonic cutting system is adapted to move transversely across the anvil 7 on two parallel and transversely extending rods 17 and 18 positioned above the table. The rods respectively pass through bearing blocks 19 and 20 on the carriage assembly. The bearing blocks contain bearings therein to permit the carriage assembly 3 to selectively move along the rods 17, 18 transversely across the width of the stock material 13. The lateral movement of the carriage assembly along the rods is controlled by a conventional motor, such as a servo motor (not shown), which can be either mounted on or near the table or on the carriage assembly.

The carriage assembly 3 further includes a carriage body 22, as best shown in FIG. 5. The carriage body 22 extends transversely between and is fixedly secured to the bottom of bearing blocks 19 and 20.

A vertically extending hanger 23 is connected to and extends downwardly from the upstream end of the carriage body 22. A support plate 24 is secured to and extends horizontally outwardly from the bottom of hanger 23. The support plate 24 can be selectively transversely adjusted relative to hanger 23. For this purpose, and as best shown in FIG. 5, the hanger has elongated slots 26 therein respectively receiving bolts 27 on the support plate to allow selective transverse adjustment of the support plate 24 relative to the hanger 23. Nuts 25 on bolts 27 may be selectively drawn down against vertically extending hanger 23 to secure the support plate 24 in the selected transverse position relative to the vertically extending hanger 23.

As shown in FIG. 2, the support plate 24 has a roller support flange 29 secured to the upstream end thereof. The vertically extending flange 29 may be transversely adjusted relative to the support plate 24. For this purpose, spaced bolts 31 on the upstream end of the support plate 24 are received in a horizontal, elongated slot 32 in the upper end of flange 29. Nuts 30 on bolts 31 may be selectively drawn down against backup member 33 to secure the roller support flange 29 in the selected transverse position relative to support plate 24.

The support flange 29 has a first roller shaft 35 mounted thereon adjacent the bottom thereof. Roller shaft 35 extends through a mounting hole in support flange 29 and is secured thereto to mount roller shaft 35 above and in a parallel relationship to strip 10 of anvil 7. A first, relatively wide roller 36 is rotatably mounted on shaft 35. The roller 36 preferably has a number of outwardly extending ribs extending circumferentially therearound. The first roller 36 applies pressure to the stock material 13 positioned between the first roller 36 and the anvil 7, as will be described in more detail hereinafter.

As shown in FIG. 1, the support plate 24 has a plurality of tapped holes 37 extending therethrough to selectively receive a threaded shaft 38 in the selected position relative to the anvil. The height of the shaft may be adjusted upwardly or downwardly relative to support plate 24 by turning the shaft in one direction or the other. As shown in FIG. 2, the bottom of shaft 38 has a yoke 39 mounted thereon which extends downwardly therefrom. The yoke 39 includes two parallel and downwardly extending arms 40, 41. A second roller shaft 42 extends between and is mounted to downwardly extending arms 40, 41. The roller shaft 42 is above and in parallel relationship to the strip 10 of anvil 7. A second, relatively narrow roller 43 is rotatably mounted on second roller shaft 42. The second roller 43 applies concentrated, downwardly directed pressure to the stock material 13 positioned between the second roller 43 and the anvil strip 10, as will be described in more detail hereinafter.

The rollers 36, 43 may additionally include a spring bias to increase the downward pressure on the stock material. For example, if the yoke is slidably mounted on shaft 38, a spring 44 can be inserted between the yoke 39 and support plate 24 to bias roller 43 downwardly toward the anvil. The spring 44 is adapted to maintain a predetermined downward pressure on the anvil 7, yet be flexible enough to allow the yoke to be raised to insert the stock material between the second roller 43 and the anvil.

As shown in FIG. 1, the rollers 36 and 43 are spaced a predetermined distance apart from each other, with each roller having an edge aligned with the inside edge of the back strip 10 of anvil 7, on the side closest to the carriage guide channel 12. As the carriage assembly 3 moves transversely across the anvil 7, each roller 36, 43 is adapted to roll across strip 10 with the inside edges of the rollers being in alignment with the inside edge of the strip 10. The rollers are located at a position on the carriage assembly such that the first roller 36 is adapted to provide the initial, general stitching of the stock material 13, while the second roller 43 is adapted to provide a localized stitch of the stock material 13, just slightly ahead of a blade 46 on the ultrasonic cutting tool 4.

The first and second rollers provide sufficient downward pressure on the stock material 13 to temporarily bond or "stitch" the material to the anvil 7. The stock material 13 is typically formed from petroleum-based products which are "sticky" or "tacky" to the touch, and hence can be temporarily adhesively bonded to a surface. Adhesively bonding the stock material just ahead of the blade permits the blade 46 to traverse the stock material at a low angle without the material moving or vibrating. Moreover, after the blade 46 has traversed the stock material 13, the material may be easily removed from the processing table by merely "peeling" it away.

Figure 8A:
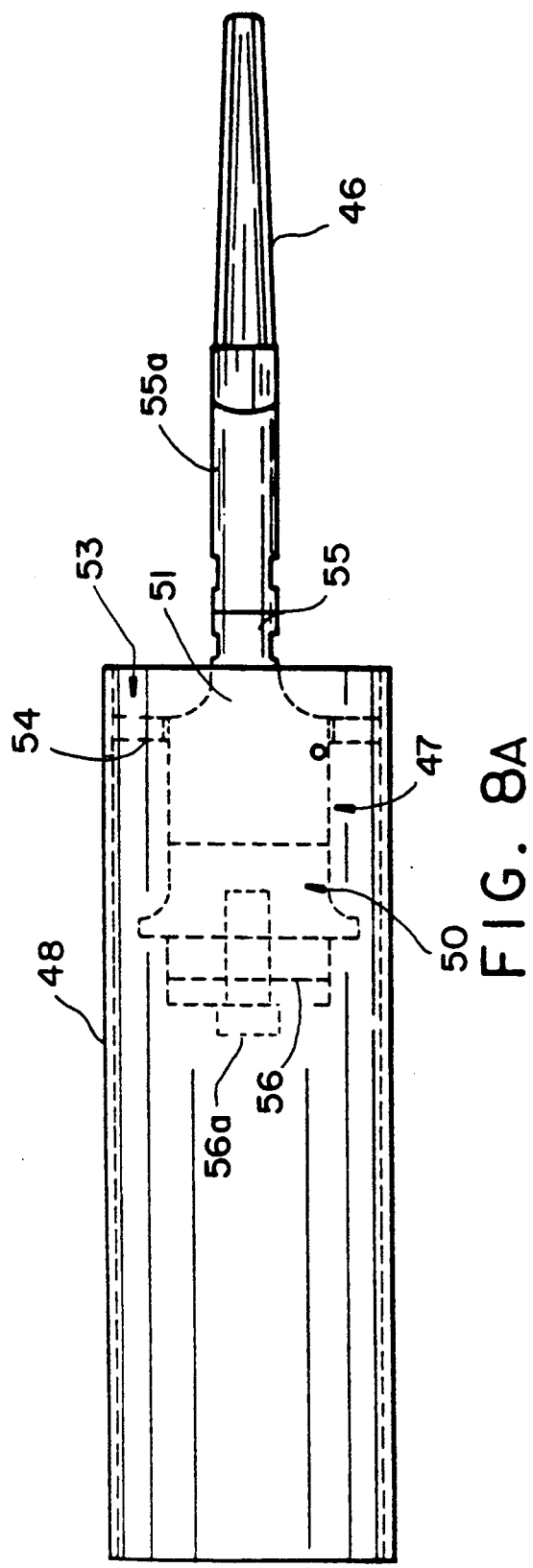
FIG. 8A is an elevation of the cutting apparatus of the ultrasonic cutting system with the transducer and suspension assembly being shown in hidden lines.

As shown in FIG. 8A, the blade 46 has sharpened edges and is mechanically coupled to a transducer, indicated generally at 47, within a housing 48. The transducer 47, blade 46 and housing 48 together cooperatively form an ultrasonic cutting tool 4 which is mounted toward the side of the carriage assembly 3. The cutting tool moves concurrently with the carriage assembly 3 as it traverses the stock material.

The transducer 47 consists of a crystal stack, indicated generally at 50, and a horn 51 which are coupled together by a stud bolt (not shown). The stack 50 and horn 51 are mounted within the transducer housing 48 by a suspension assembly, indicated generally at 53, which insulates the housing from the ultrasonic energy. As shown in detail in FIG. 8B, the suspension assembly 53, for example, includes an outer ring 54, an inner ring 52 and two O-rings 45, disposed between the inner ring and opposite sides of flange 51a on the horn. The outer ring has four tapped bores 65A (FIG. 8C) therein spaced 90° apart from one another. The four tapped bores 65A are respectively in radial alignment with four circumferentially spaced bores 65B in inner ring 52 and four circumferentially spaced bores 65C in the horn 51.

As shown in FIG. 8C, four pins, indicated generally at 66, disposed 90° apart from each other, extend radially inward in aligned bores 65A-C from the outer ring 54 into the horn 51. The pins 66 have threaded heads 66A at their radially outer ends to allow the pins to be held in position by the threaded connection between the heads 66A and the tapped bores 65A. This threaded connection on the pins secures the suspension assembly 53 to the horn 51 and prevents the horn 51 from rotating within the suspension assembly 53.

The outer ends of the heads 66A of pins 66 are received within the confines of bores 65A to help prevent ultrasonic energy loss through the pins to the suspension assembly 53. Further, the suspension assembly 53 is located at a position along the transducer 47 that corresponds to an ultrasonic energy nodal point, such that a minimum amount of energy is lost by transmission through the suspension assembly 53.

The horn 51 of the transducer 47 extends forwardly from its coupling with the stack and narrows down to a forward necked end, shown generally at 55 in FIG. 8A, a portion of which protrudes from the transducer housing. A holder 55a is mechanically coupled to the necked end 55 by a stud bolt (not shown). The holder 55a has a blind end bore (not shown) in the forward end which is adapted to receive the rear end of blade 46. The blade 46 is mechanically soldered within the blind end bore by conventional processes.

The crystal stack 50 is ultrasonically driven by a set of piezoelectric crystals, shown generally at 56, which are located at the end of the crystal stack 50 and which are mechanically coupled thereto by compression bolt 56a. The crystals 56 are typically formed from PZT8 material. The crystal stack 50 is of the type commercially available, such as that available from Branson Ultrasonics.

In the preferred form of the invention, the crystals 56 are driven with square waves and are adapted to produce oscillations in the 40 Khz range in the crystal stack. The oscillations produce ultrasonic compressive energy waves axially down the crystal stack 50, horn 51 and holder 55a, and subsequently down the blade 46. The horn 51 can be tuned so that the ultrasonic energy produces standing waves along the blade 46 having a maximum near the point that the blade is adapted to enter the stock material 13. Accordingly, when the blade 46 contacts the stock material, the oscillating blade cleanly cuts through the material.

Figure 3:
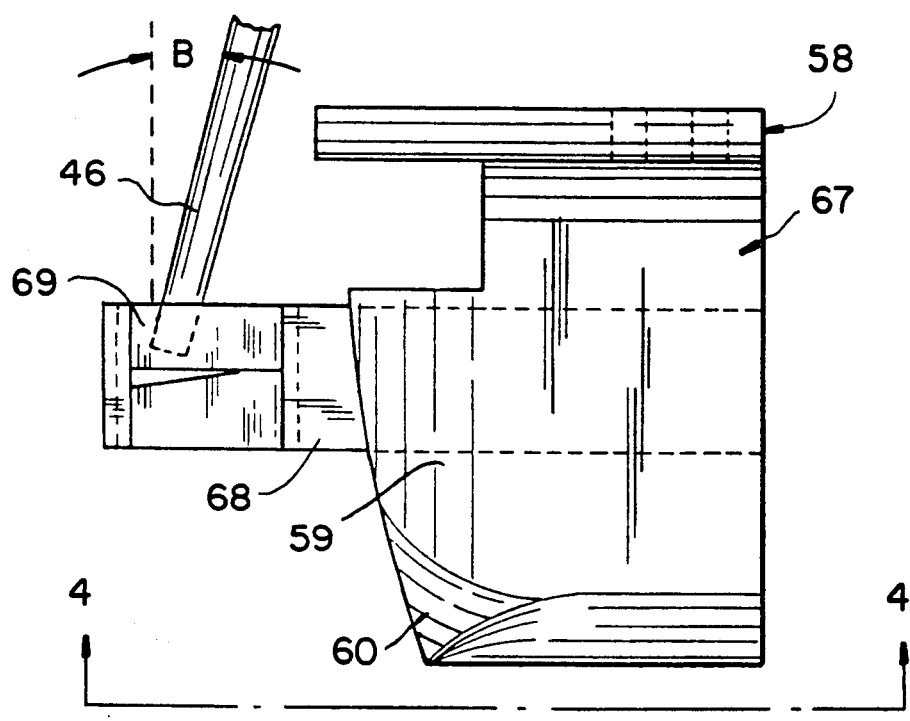
FIG. 3 is a plan view of the carriage assembly shoe taken along the plane 3—3 of FIG. 2.
Figure 6:
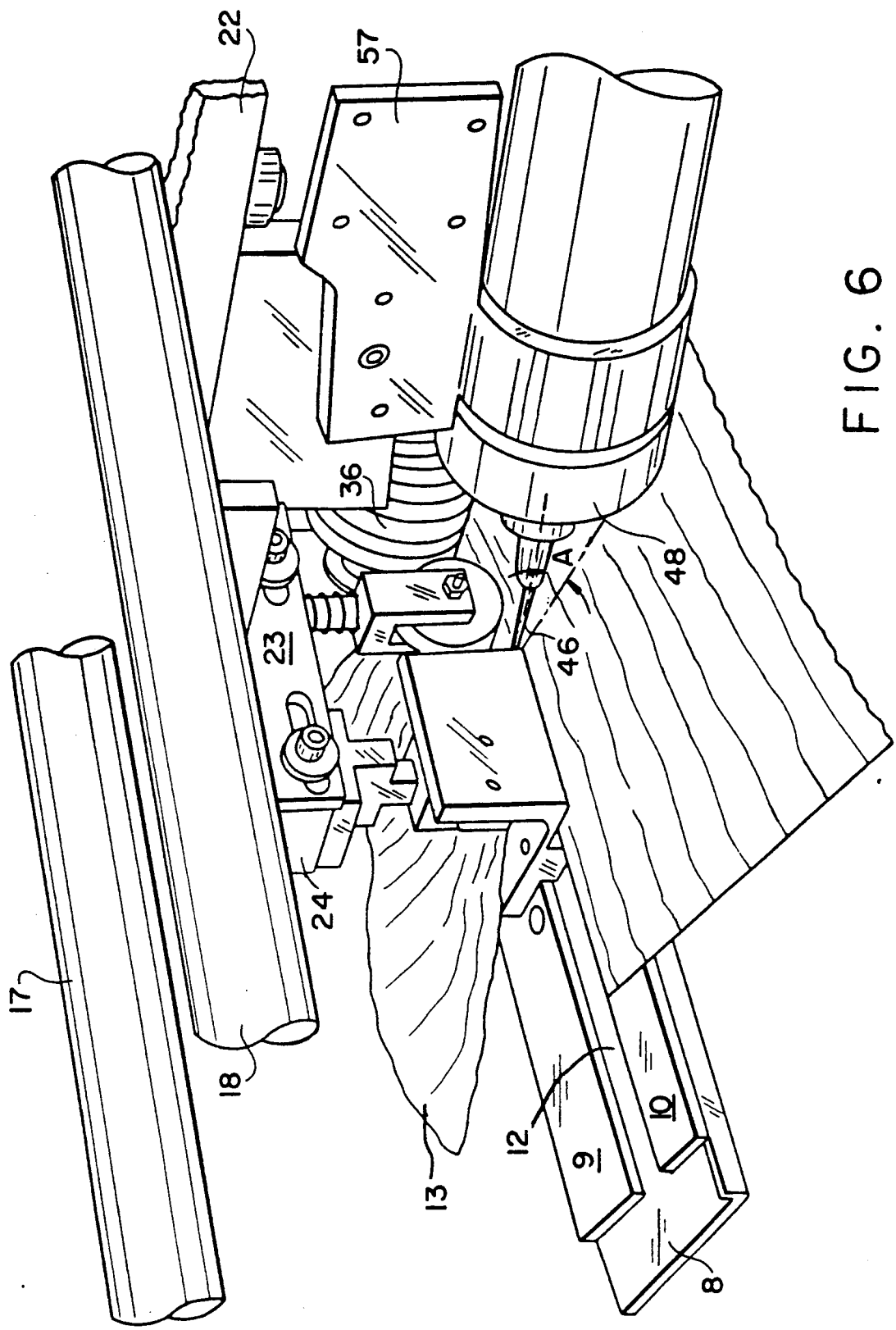
FIG. 6 is a diagonal downstream perspective of the ultrasonic cutting system, similar to but enlarged from FIG. 5, showing the blade ultrasonically cutting the stock material.

As shown in FIG. 6, the ultrasonic cutting tool 4 is fixedly mounted to the carriage assembly 3 by bracket 57. Bracket 57 has a collar, which extends circumferentially around and supports the housing of the transducer. The ultrasonic tool 4 is mounted to the carriage assembly 3 such that the blade 46 extends outwardly from the horn 51 (FIG. 8) at a low angle, preferably at angle of about 5° to 10° with respect to the horizontal, as represented by angle A in FIG. 6. It has been found that, for stock material having thicknesses of up to 0.28 cm, mounting the cutting tool 4 on the carriage assembly 3 at an angle A of about 5° to 8° results in a preferred cut of the stock material 13. For stock material of thicknesses up to 0.49 cm, an angle A of about 8° to 10° is preferable. For stock material thicker than 0.49 cm, the angle A should be set so that the width of the cut surface of the stock material is between about 1.00 cm and 2.88 cm. Additionally, as best shown in FIG. 3, the blade 46 extends at an angle offset from an axis normal to the anvil by about 0° to 15°, and preferably at an angle of about 15°, to achieve an enhanced cutting system for most stock materials. This angle is illustrated at B in FIG. 3.

The low angle of the blade 46 relative to the horizontal creates a beveled cut having a width of between about 1.00 cm and 2.88 cm. The wide cut is extremely tacky which allows the freshly cut end portion to be applied to another cut end portion to create a high strength bevel lap splice without end ply overlap. Conventional splicing techniques result in a tire having an inner ply wherein the two end portions have an overlapped portion, as shown indicated generally at "C" in FIG. 1A, or a crush-cut portion, as indicated generally at "D" in FIG. 1B. However, the bevelled cut provided by the present invention provides for a tire having an inner ply wherein the two portions of the material substantially seamlessly bonded together to provide a circumferentially continuous ply of stock material, as indicated generally at "E" in FIG. 1C.

As shown in FIG. 1, the carriage assembly 3 further includes an L-shaped shoe, indicated generally at 58, extending downwardly therefrom. The shoe 58 is mounted transversely behind blade 46 and thus travels immediately behind the blade 46 when the carriage assembly 3 is moving across the anvil 7. The shoe 58 has a substantially wedge-shaped upper surface 59 with rearwardly tapered and flared edges 60. Shoe surface 59 is adapted to slide between the stock material 13 and the anvil 7, thereby lifting and separating the material from the table as will be described in more detail below.

The shoe 58 is mounted from a suspension arm 61 extending downwardly from support plate 24. A generally L-shape bracket 62 can be selectively longitudinally adjusted relative to the arm 61. For this purpose, the bracket 62 has a slot 63 in one leg thereof to receive bolt 64 on arm 61. Nut 65 on bolt 64 may be selectively drawn down against the bracket to secure the bracket in the selected longitudinal position relative to the arm 61 and carriage body 22. The shoe 58 is bolted to the other leg of bracket 62.

Figure 4:
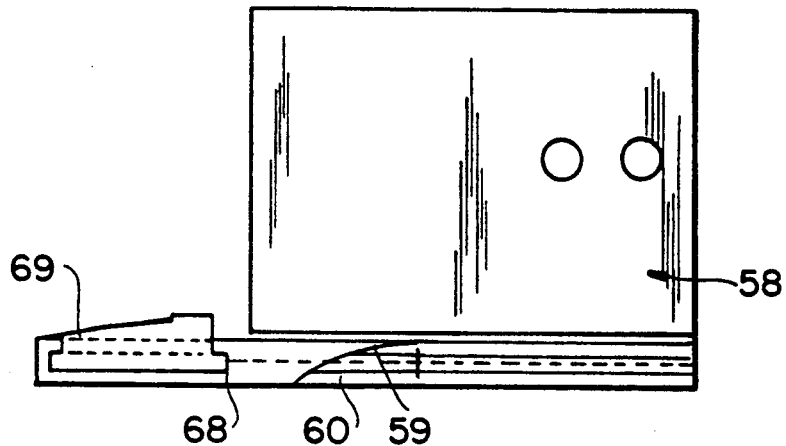
FIG. 4 is a side view of the shoe taken along the plane 4—4 of FIG. 3.

The bottom portion 67 of the shoe 58 forms a flat surface that is adapted to slide along the top surfaces of strips 9 and 10 on anvil 7. As shown in FIGS. 3 and 4, the bottom portion 67 of the shoe 58 includes a generally centrally positioned guide projection 68 fixedly attached to and extending downwardly therefrom. The projection 68 is slidingly received in the guide channel 12 defined in the anvil 7. The guide projection 68 sliding in guide channel 12 maintains the alignment of the shoe and carriage assembly 3 with respect to the anvil 7 and stock material 13.

The forward end of the guide projection 68 has a blade rest 69 mounted thereon and extending upwardly therefrom. The blade rest is preferably formed from a Teflon material and has a pocket formed therein. As best shown in FIG. 3, the free end of the blade is received in the pocket portion of the blade rest 69. Both the blade 46 and the blade rest 69 are designed to move in unison across the processing table with the carriage assembly. Anchoring the end of blade 46 in the blade rest 69 prevents damaging oscillations of the free end of the blade that could result in cracking or breakage.

In the materials processing line, shown in FIG. 1, the stock material 13 is brought along the processing table 2 until the desired amount of material stretches over, and is downstream of, the anvil 7. High frequency energy is then applied to the cutting tool 4 to produce ultrasonic waves within the crystal stack 50, horn 51 and holder 51a, (FIG. 8A), and consequently compression forces axially along the length of the blade 46. As shown in FIGS. 5 and 7, the carriage assembly 3 is moved across the stock material 13 with the two rollers 36, 43 leading the blade 46. The downward pressure of the rollers 36, 43 on the stock material 13 causes the material to be temporarily adhesively bonded to the anvil 7, particularly in the area immediately in front of the blade.

As the blade 46 passes through the stock material 13, the angle of the blade creates a bevelled cut having a width of approximately 1 cm from the edge of the cut. The carriage assembly 3 traverses the stock material 13 until the blade finishes its cut and reaches the opposite end. Typically, the blade 46 takes longer to traverse the thicker portions of the stock material than the thinner portions of the material.

In the preferred form of the invention, as shown in FIG. 6, as the blade cuts through the stock material, the upper surface 59 of trailing shoe 58 lifts the back portion of the cut stock material 13 away from its adhesive bond with the anvil 7. The surface 59 and the flared edge 60 also peels or bends the material away from the cut, as schematically illustrated in FIG. 6. The forward, cut length of the stock material 13 is either manually or automatically removed from the table and processed into the finished tire, while the uncut portion of the material 13 is moved down the processing table to be positioned for another cut.

In another embodiment of the invention, the number of stitching rollers may be increased. The additional rollers may, for example, extend downwardly from additional holes in support plate 24 (FIG. 1) and be located at selected positions along the strip 10 of the anvil 7. For example, a series of up to seven rollers can be used, with four of the rollers positioned ahead of the blade. Additionally, a fifth roller can be located substantially on top of the blade, and a sixth and seventh roller can be positioned behind the blade. At least two of the rollers, one in front of the blade and one in back of the blade, are vertically aligned with the inside edge of the back strip of the anvil. Moreover, the leading two rollers may be toed-in, and the last two rollers may be toed-out, to stretch the stock material during the cutting process and further enhance the cutting efficiency.

The use of additional rollers increases the area of temporary adhesive bonding of the stock material to the anvil. However, it has been found that, by using two rollers 36, 43 with one roller 43 located directly in front of the blade, a sufficient bond of the stock material to the anvil is achieved to obtain the desired cut.

Further, both the front and rear strips of the anvil 7 may include a number of holes 71 spaced therealong which are adapted to draw a vacuum therethrough. The holes 71 are spaced uniformly over the length of either the front and back strips 9, 10 on the anvil 7 when the stock material 13 is laid over the anvil 7, the vacuum is applied to the bottom of the stock material to securely bond the material to the anvil. The bonding by vacuum may be further enhanced by clamps to compress the soft material against the anvil. Hence, when the blade 46 traverses the stock material, the aforementioned cut may be made on stock material securely held to the anvil.

Figure 9:
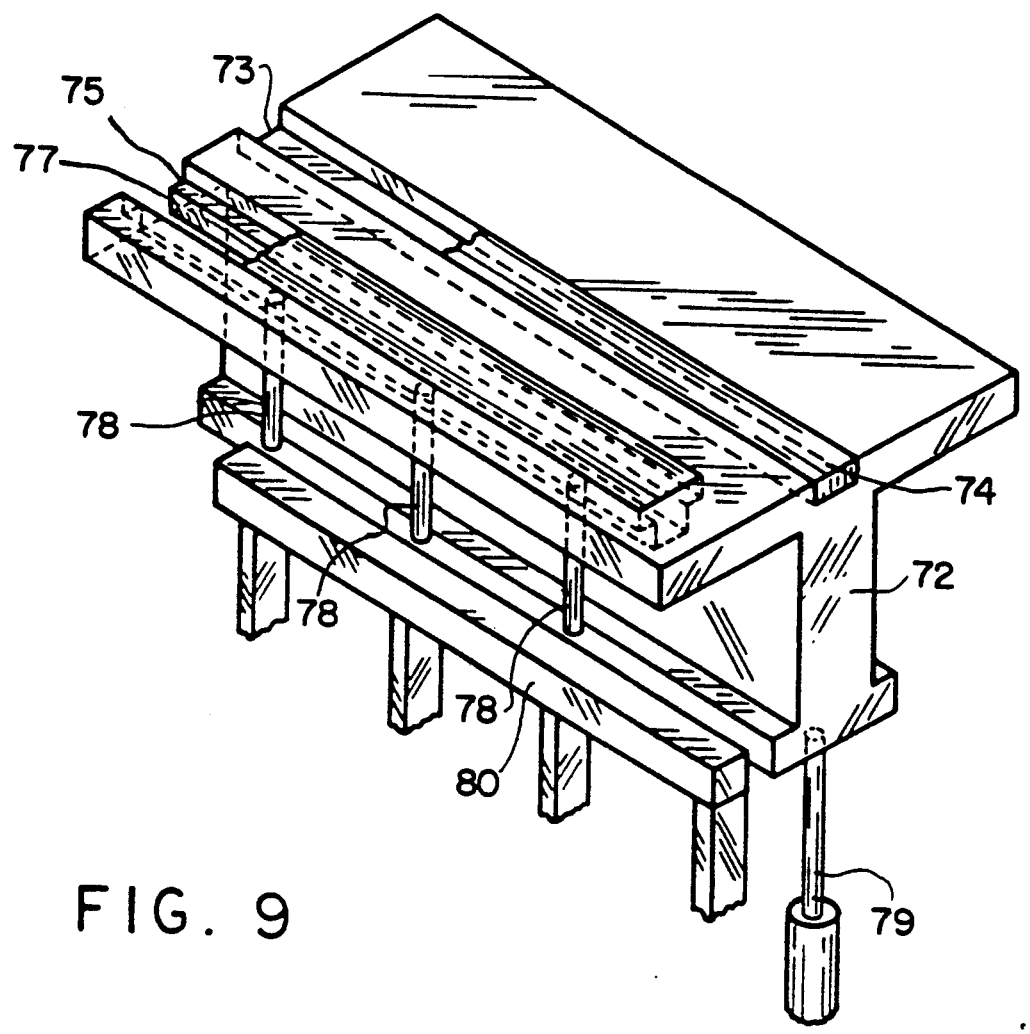
FIG. 9 is a perspective view of an alternative anvil embodiment.
Figure 10:
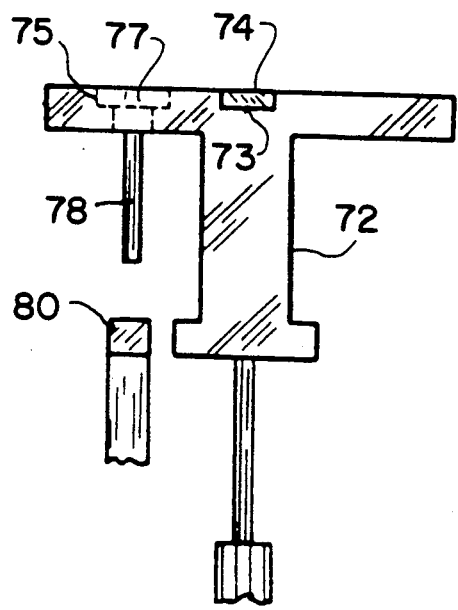
FIG. 10 is an end elevation of the anvil of FIG. 9 showing the details of the stock material stripper bar.

In another embodiment, as shown in FIGS. 9 and 10, the anvil comprises a substantially T-shaped member 72 located immediately adjacent the end of the feed table 6. The T-shaped member 72 is adapted to be moved vertically relative to the processing table. The T-shaped member 72 has a channel 73 formed in the top side thereof and extending thereacross. This channel 73 receives a Lexon plastic strip 74 along the cutting axis. Alternatively, channel 73 may be used as a guide channel cooperating with the projection on the carriage assembly shoe.

The T-shape member 72 includes a stepped slot 75 in its top surface parallel to and closely spaced from channel 73. The stepped slot 75 extends from adjacent one end of the upper web of member 72 to adjacent its other end. The slot 75 passes entirely through the upper web of T-shaped member 72.

Stepped slot 75 receives a T-shape stripper bar 77 therein, with the stripper bar being supported by its shoulders resting on the step of slot 75, as best shown in FIG. 10. Pins 78 extend downwardly from the bottom of stripper bar 77. When the T-shaped member or base 72 is lowered by piston cylinder assemblies 79, the pins 78 engage a fixed stop bar 80 positioned therebelow. As the base 72 descends further, the stripper bar 77 is "elevated" relative to the upper surface of the base to strip the stock material thereon from the base.

Figure 11:
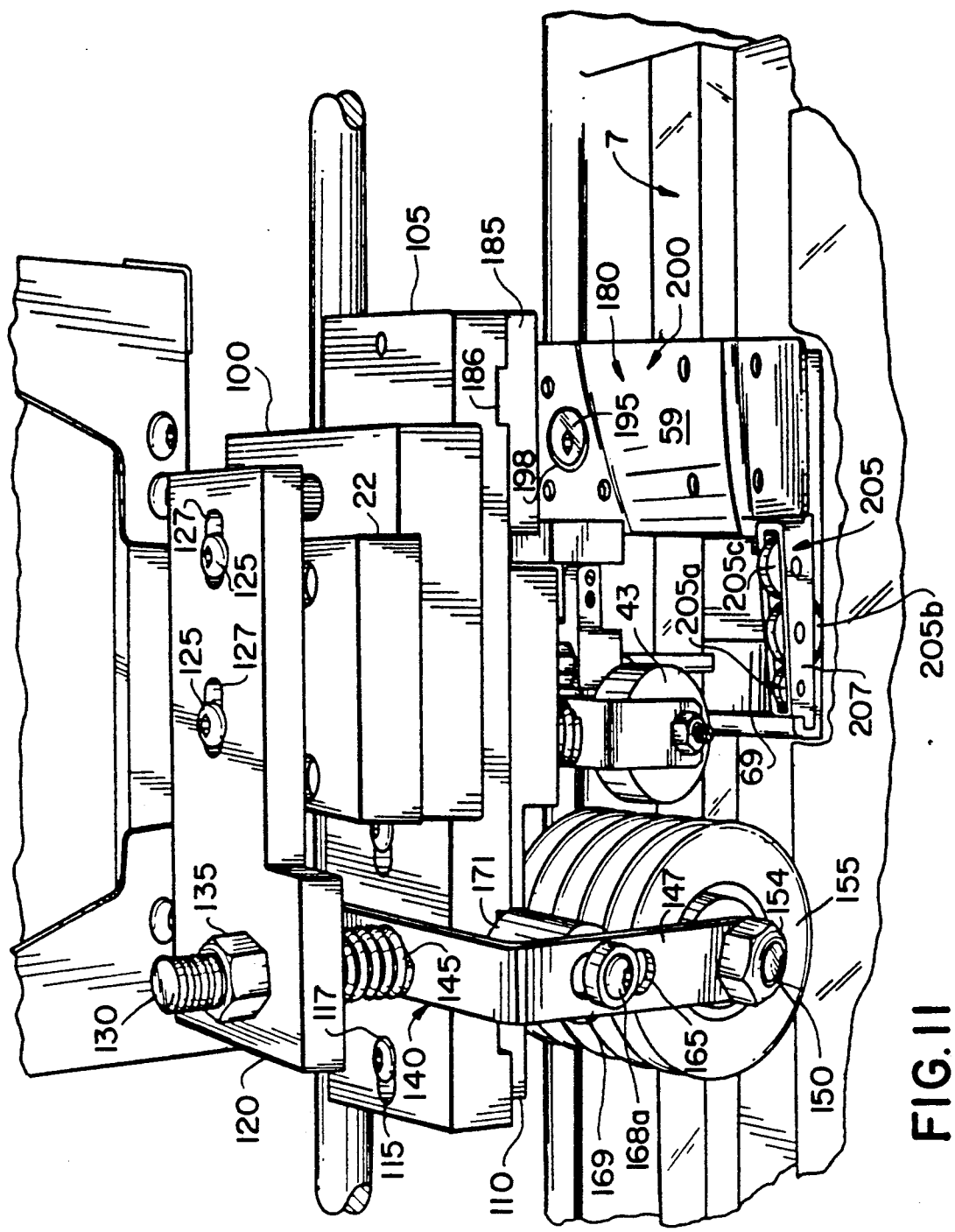
FIG. 11 is a side upstream perspective view of an additional embodiment of the ultrasonic cutting system.

In still another embodiment of the invention, as shown in FIG. 11, a spacer 100 is connected to and extends downwardly from the upstream end of the carriage body 22. Hanger 105 is connected to and extends downwardly from spacer 100. A support plate 110 is secured to and extends downwardly from the bottom of hanger 105. The support plate 110 can be selectively transversely adjusted relative to hanger 105. For this purpose, the hanger 105 has elongated slots 115 therein respectively receiving bolts 117 to allow selective transverse adjustment of the support plate 110 relative to the hanger 105. Bolts 117 have nuts (not shown) which may be selectively drawn up against the bottom of support plate 110 to secure the horizontally extending support plate 110 in the selected transverse position relative to the hanger 105.

Additionally, as shown in FIG. 11, a horizontally and transversely extending roller support flange 120 is secured to the top surface of the carriage body 22. The support flange 120 may be transversely adjusted relative to the carriage body 22. For this purpose, spaced bolts 125 are received in elongated slots 127 through support flange 120. Bolts 125 may be selectively drawn down against flange 120 to secure the roller support flange 120 in the selected transverse position relative to the carriage body 22.

The support flange 120 has a downwardly extending first threaded shaft 130 received in a bore at one end of the support flange. A nut 135 can be threaded onto the threaded shaft 130 and bears against the upper surface of support flange 120. The position of the nut controls the vertical position of the shaft 130 relative to support flange 120. Shaft 130 extends downwardly and has a roller support bracket, shown generally at 140, mounted to its lower end.

A spring 145 may be located on shaft 130 between support flange 120 and roller support bracket 140. Spring 145 biases the roller support bracket away from support flange 120 to bring nut 135 into engagement with support bracket 120.

Figure 13:
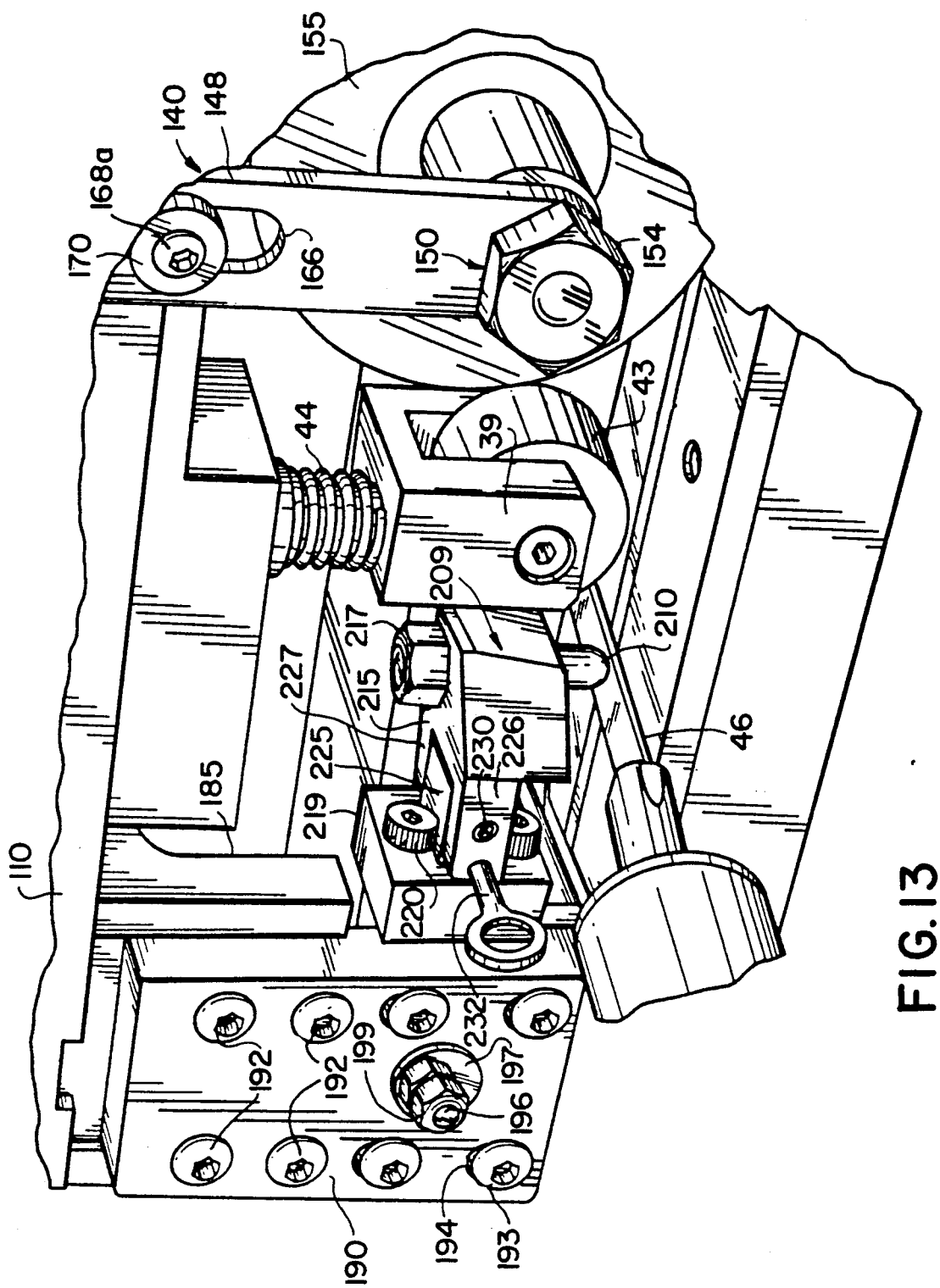
FIG. 13 is a diagonal downstream perspective of the ultrasonic cutting system of FIG. 12, with portions removed for clarity and with a blade stabilizing assembly added.

Roller support bracket 140 further includes two downwardly extending parallel arms 147, 148 as shown in FIGS. 11 and 13, respectively, having a roller shaft, indicated generally at 150, extending therebetween. Roller shaft 150 extends through aligned mounting holes in the arms of roller support bracket 140. Shaft 150 is secured to the respective arms by nuts 154 threaded onto the opposite free ends of shaft 150. The shaft is above and in parallel relationship to strip 10 of anvil 7. A wide roller 155, is rotatably mounted on shaft 150 and provides downward pressure to the stock material.

Further, roller support bracket 140 is vertically guided to maintain proper alignment with the anvil 7. For this purpose, guide stud 168a extends longitudinally through support plate 110. The outer ends of the guide stud are received in a vertically extending slot 165, 166, respectively, in arms 147 or 148. A spacer washer 170 is received on one end of guide stud 168a between the outside edge of downwardly extending arm 148 and the one head of stud 168a. Similarly, spacer washer 169 is received on the other end of stud 168a between the outside edge of downwardly extending arm 147, and a second head of stud 168a. Additionally, spacer 171 is received on stud 168a and extends between the support plate 110 and the inside edge of downwardly extending arm 147.

The guide stud, spacers and the sliding attachment of shaft 130 with support flange 120, thereby maintains the vertical alignment of the roller support bracket, and hence with respect to anvil 7. The roller support bracket 140 is biased downwardly toward anvil 7 by spring 145. The spring is adapted to maintain a predetermined downward pressure on the anvil 7, yet be flexible enough to allow the roller support bracket, and hence shaft 130 and nut 135, to be raised to insert the stock material between the roller and the anvil.

A second roller 43 is mounted to and extends downwardly from the support plate 110. The construction of second roller assembly in this embodiment is substantially the same as the construction described in connection with the first embodiment.

Still further, as shown in FIGS. 11, an L-shaped shoe, indicated generally at 180, is mounted from a suspension arm 185 by a plate 190 (FIG. 13). Suspension arm 185 is received in groove 186 of hanger 105, extends downwardly therefrom and may be adjusted longitudinally relative to hanger 105. Plate 190 can be fastened to the suspension arm 185 by conventional fasteners, such as by nuts and bolts. For this purpose, as shown in FIG. 13, spaced bolts 192 pass through bores in plate 190 into tapped holes in suspension arm 185 in alignment therewith.

Similarly, the shoe 180 can be mounted to the bottom of plate 190. For this purpose, plate 190 has a plurality of elongated slots 194 passing therethrough. Bolts 193 pass through slots 194 into tapped holes in the vertical arm of shoe 180. The slots 194 allow the shoe to be vertically adjusted relative to the plate 190. This vertical adjustment may be closely controlled by an eccentric adjustment mechanism.

The eccentric adjustment mechanism includes an elliptical drive shaft 195 that extends through an oversized bore in plate 190 into a circular opening 198 in the vertical leg of shoe 180. As the elliptical drive shaft is turned, the surface thereof cammingly engages the opening 198 to raise or lower the shoe 180. When the proper shoe position is obtained (preferably providing a clearance of approximately 3/1000 of an inch between the bottom of the shoe and the anvil), the shoe is tightly secured.

For this purpose, the elliptical drive shaft 195 has a threaded shank 196 on its downstream end. A washer 197 is positioned on shank 196. For locking, the washer is drawn against the plate 190 by nuts 199. The bolts 193 are then tightened against the plate to complete the rigid mounting of shoe 180 to plate 190 in its selected vertical position.

The shoe 180 includes a bottom portion, indicated generally at 200 and shown in FIG. 11. This shoe is substantially the same in design and function as the bottom portion 67 of shoe 58 in the first embodiment as described herein. Specifically, the bottom portion 200 of shoe 180 includes a wedge shape surface 59, a blade rest 69 and a guide projection 68 extending therebetween and connected thereto. The bottom portion has a roller assembly 205 attached thereto. Roller assembly 205 preferably includes, for example, three rollers 205a, 205b, 205c, mounted within a bracket 207. Rollers 205a-205c extend in a coplanar relationship along the side of the bottom portion 200 of shoe 180. The rollers increase in diameter as they get closer to the wedge shape surface 59. Each roller has an axle extending therethrough which is rotatably attached to opposing sides of bracket 207. The bracket 207 in turn is attached to the side of the bottom portion 200.

The three rollers are adapted to facilitate the removal of the stock material from its adhesive bond with the anvil. The stock material tends to removably adhere to the rollers and consequently "ride up" the rollers and onto the shoe during rotation of the rollers. By increasing the diameter of the rollers and having the top surface of rollers 205c positioned above the leading edge of the wedge shape stripping surface, the material 13 is easily removed by the shoe passing between the anvil and the material.

Additionally, as shown in FIG. 13, a blade stabilization assembly, shown generally at 209, having spring-loaded teflon button 210 can be included with the carriage assembly to minimize the possibility of the blade either cracking or breaking. The teflon button 210 is adapted to engage the top surface of blade 46 to damp out potentially damaging vertical vibrations of the blade. The teflon button 210 extends through a bore in bracket 215 and is secured thereto, as shown at 217. Bracket 215 is pivotally connected to holder 219, which in turn is removably attached to shoe 180 by bolts 220. Holder 219 includes an outwardly extending tongue member 225. Bracket 215 has a yoke comprising two arms 226, 227, which extend along opposite sides of tongue member 225. The arms 226, 227 are pivotally connected to the outwardly extending tongue member 225 by a horizontally extending pivot bolt 230. Bolt 230 is received in a first set of cooperating and aligned holes in arms 226, 227 and member 225.

Additionally, a second set of cooperating holes are provided in arms 226, 227 and member 225 to maintain the horizontal alignment of the bracket 215 with respect to the anvil, and to maintain a predetermined downwardly directed pressure on the blade. For this purpose, a key pin 232 is adapted to be received in the second set of holes when bracket 215 and member 225 are horizontally aligned. When key pin 232 is inserted in the second set of holes, bolt 230 and pin 232 maintain the horizontal alignment of the bracket 215 with the member 225, and hence the anvil 7. Pin 232 is adapted to be removed to allow the bracket 215 to be pivoted around pivot bolt 230. The button 210 can thus be pivoted away from its engagement with the blade 46 to facilitate repairs to the blade or to the teflon button. Accordingly, when key pin 232 is inserted within the second set of holes in arms 226, 227 and member 225, the spring-loaded teflon button 210 is adapted to contact blade 46 and limit the vertical vibrations of the oscillating blade, to thereby increase the precision of the cut. Moreover, the button 210 increases the life of the blade by minimizing vibrations that can cause metal fatigue.

Figure 12:
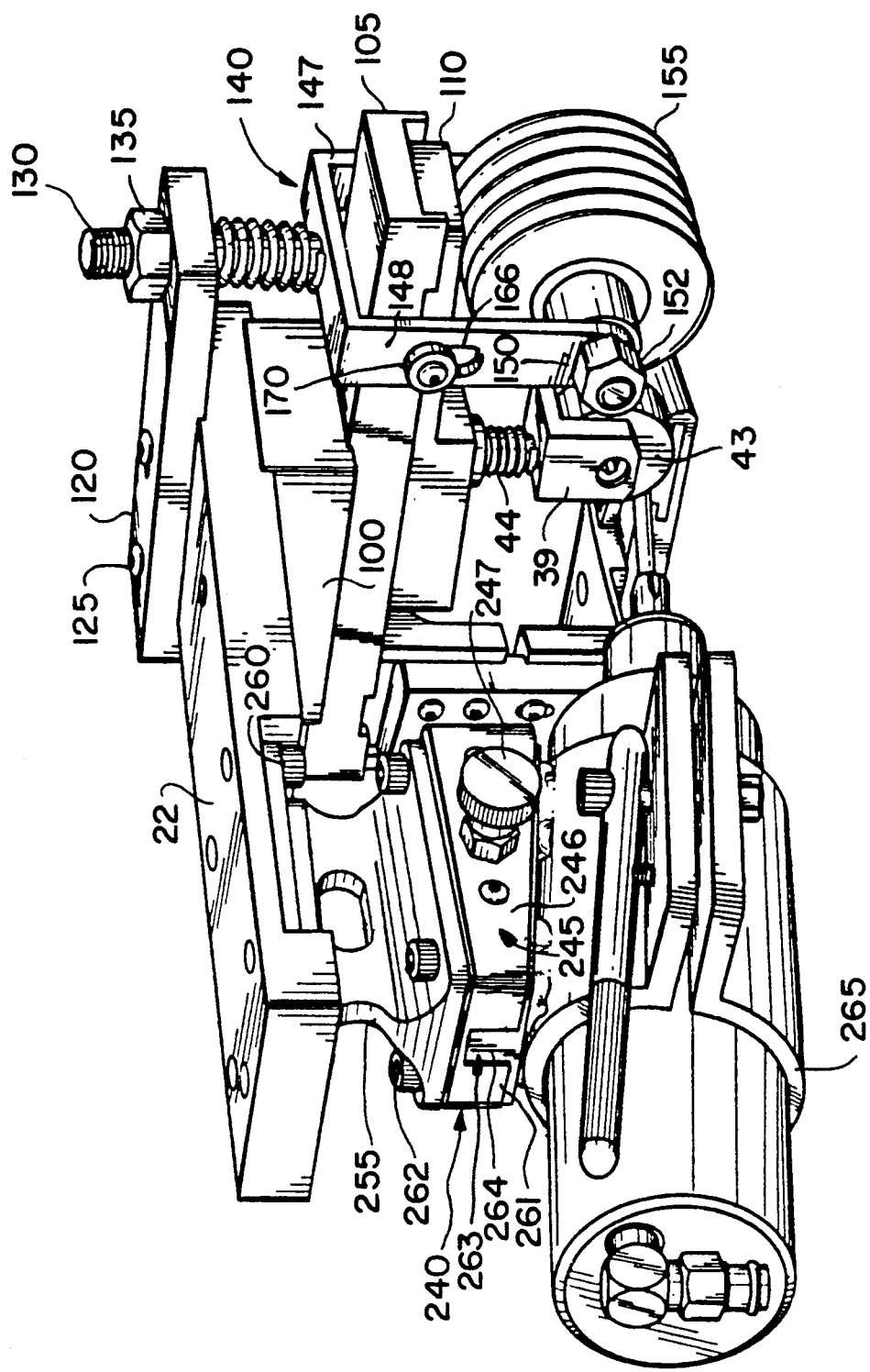
FIG. 12 is a diagonal downstream perspective of the ultrasonic cutting system of FIG. 11.
Figure 14:
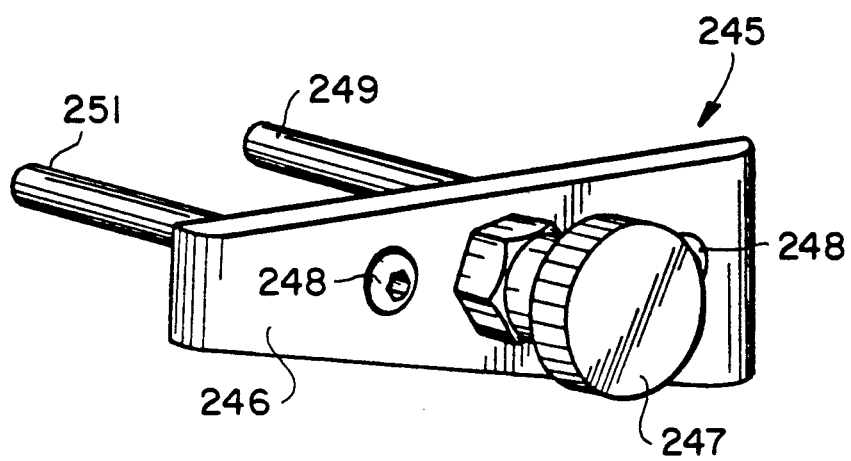
FIG. 14 is schematic elevation of the disconnect member of the quick connection system for the cutting tool.

Additionally, as shown in FIG. 12, the ultrasonic cutting tool may include a quick connect system, indicated generally at 240, wherein a failed transducer can be quickly replaced, or an operating transducer can be accurately adjusted to a selected angle at a location separate from the cutting system, and then quickly fitted into place on the carriage body 22. As shown in FIG. 14, the quick connect system includes a disconnect member, indicated generally at 245. The disconnect member 245 includes plate 246, knob 247 and shafts 249, 251. Knob 247 extends outwardly from the front side of plate 246 and is used to turn a threaded bolt on the other side of the plate 246. Shafts 249, 251 are attached to the back side of plate 246 with bolts 248 and extend outwardly therefrom.

In the quick connect system, a modified bracket 255, having a substantially I-beam shape, is secured to carriage body 22 by bolts 260, and extends downwardly therefrom. Further, mounting flange 261 is secured to the bottom web of modified bracket 255 by bolts 262. Mounting flange 261 extends downwardly from brackets 255. Mounting flange 261 includes an inverted groove, indicated generally at 263, extending along the length of the flange. Groove 263 is adapted to receive a tongue 264 on support collar 265.

To support the transducer on the carriage body, the transducer housing 48 is fitted within collar 265 and the tongue 264 of the collar 265 is received within the groove in flange 261. The knob 247 is turned to advance the threaded bolt into a tapped hole in the mounting flange 261 to hold the plate 246 in mounted position on mounting flange 261. In such position, the shafts 249, 251 of disconnect member 245 are received in cooperating bores in mounting flange 261 and tongue 264 to thereby support the transducer housing. Disconnect member 245 may be removed from flange 261 be reverse rotating knob 247 to remove shafts 249, 251 from the aligned bores in the tongue and mounting member. Once disconnect member 245 is removed, collar 265 can be removed from the carriage and a new collar and transducer attached. Consequently, disconnect member 245 allows the quick change of transducers for use with the ultrasonic cutting system.

By providing an ultrasonic cutting system that uses ultrasonic energy to cut stock material, a low angle cut of the stock material can be achieved. With the stock material adhesively bonded to the anvil, the blade traverses the material without the material moving or vibrating, thereby decreasing the cutting time and increasing the quality of the cut. Further, the material can be cut at a low angle to increase the surface area of the cut portion and to allow the cut surface to be substantially seamlessly bevel lap spliced to the cut surface at the other end of the stock material in the tire building process. Moreover, the substantially seamless splice reduces the radial forces on the splice, improves the balance of the tire, and reduces tire cure time. Additionally, the material savings in eliminating the end ply overlap reduces the overall cost of the tire.

It will be apparent from the foregoing that changes may be made in the details of construction and configuration without departing from the spirit of the invention as defined in the following claims.

I claim:

1. An ultrasonic cutting apparatus for stock material, comprising:
   a means for temporarily securing the stock material to an anvil;
   a carriage assembly having means for transverse movement across the width of the anvil; and
   an ultrasonic cutting tool mounted on said carriage;
   said cutting tool having a blade mechanically coupled thereto, said blade having means for resonating in response to ultrasonic energy travelling longitudinally therethrough;
   wherein when said carriage assembly moves transversely across said anvil, said blade cuts through and across the stock material,
   said carriage assembly further including a shoe slidably engaging the stock material at a location behind said blade to separate the stock material from said anvil after the blade has cut the stock material, said shoe having a projection slidably moving within a guide channel formed in said anvil.

2. An ultrasonic cutting apparatus for stock material as in claim 1, wherein said means for temporarily securing the stock material comprises at least one pressure roller mounted on said carriage assembly to secure the stock material to said anvil at a location in front of said blade.

3. An ultrasonic cutting apparatus for stock material as in claim 2, wherein said at least one pressure roller temporarily stitches the stock material to said anvil.

4. An ultrasonic cutting apparatus for stock materials as in claim 3, wherein means for securing the stock material comprises two pressure rollers, wherein one of said at least one pressure roller is spring biased into engagement with the stock material.

5. An ultrasonic cutting apparatus for stock material as in claim 1 wherein said means for temporarily securing the stock material comprises at least two pressure rollers mounted on said carriage assembly to secure the stock material to said anvil at a location in front of said blade.

6. An ultrasonic cutting apparatus for stock material as in claim 1 wherein said means for temporarily securing the stock material to the anvil includes vacuum means.

7. An ultrasonic cutting apparatus to stock material as in claim 1, wherein said blade is offset at an angle of about 0° to 15° relative to an axis normal to the anvil.

8. An ultrasonic cutting apparatus for stock material as in claim 7, wherein said blade preferably cuts said stock material at an angle of between 5 and 10 degrees with respect to the horizontal for stock material under 0.49 cm thickness or, for material of thickness greater than 0.49 cm, at an angle such that the cut surface of the stock material has a width of between about 1.00 cm and 2.88 cm.

9. An ultrasonic cutting apparatus for stock material as in claim 1, wherein said shoe for separating the stock material is mounted on said carriage.

10. An ultrasonic cutting apparatus for stock material as in claim 1, wherein said shoe includes at least one roller mounted on the shoe.

11. An ultrasonic cutting apparatus for stock material as in claim 10, wherein said shoe includes at least two rollers increasing in diameter toward a wedge-shape stripping surface on the shoe to assist in lifting the stock material onto the stripping surface.

12. An ultrasonic cutting apparatus for stock material as in claim 11 wherein the anvil has a base and two parallel strips mounted on top of said base, the strips defining therebetween the guide channel.

13. An ultrasonic cutting apparatus for stock material as defined in claim 1, wherein the anvil has two members, one of said two members being selectively vertically movable with respect to the other of said two members to assist in stripping the stock material from the anvil after cutting.

14. An ultrasonic cutting apparatus for stock material as defined in claim 1, wherein said cutting tool is removably connected to said carriage with a disconnect device, said disconnect device including at least one removable shaft maintaining said cutting tool in supported relation with said carriage.

15. An ultrasonic cutting system for stock material as in claim 1, wherein said means for temporarily securing the stock material to the anvil temporarily stitches the stock material to the anvil.

16. An ultrasonic cutting apparatus for rubber stock material, comprising:
   means for temporarily securing the rubber stock material to an anvil;
   a carriage moveable across the width of the anvil; and an ultrasonic cutting tool mounted on said carriage, said ultrasonic cutting tool having:
a) a transducer housing,
b) a crystal stack with a set of piezoelectric crystals coupled thereto,
c) a horn mechanically coupled to said crystal stack,
d) an ultrasonic cutting blade for cutting stock material mechanically coupled to said horn,
e) a suspension assembly for mounting said crystal stack, horn and ultrasonic cutting blade at least partially within said transducer housing, said suspension assembly including an inner ring extending circumferentially around said horn, an outer ring extending circumferentially around said inner ring, and mounting means for releasably mounting said suspension assembly to said horn;
wherein when said carriage assembly moves transversely across said anvil, said blade cuts through and across the stock material, said carriage further including a shoe slidably engaging the stock material at a location behind said blade to separate the stock material from the anvil after the blade has cut the stock material, said shoe having a projection slidably moving within a guide channel formed in said anvil.

17. An ultrasonic cutting apparatus for stock material, comprising:
means for temporarily securing the stock material to an anvil;
a carriage assembly moveable across the width of the anvil; and
an ultrasonic cutting tool mounted on said carriage;
said cutting tool having a blade mechanically coupled thereto, said blade resonating in response to ultrasonic energy travelling longitudinally therethrough, and said carriage having a restraining button with a damping means for providing downwardly directed pressure on said blade to dampen vertical oscillations thereof;
wherein when said carriage assembly moves transversely across said anvil, said blade cuts through and across the stock material.

18. An ultrasonic cutting apparatus for stock material, comprising:
means for temporarily securing the stock material to an anvil;
a carriage assembly moveable across the width of the anvil; and
an ultrasonic cutting tool mounted on said carriage;
said cutting tool having a blade mechanically coupled thereto, said blade resonating in response to ultrasonic energy travelling longitudinally therethrough;
wherein when said carriage assembly moves transversely across said anvil, said blade cuts through and across the stock material,
said anvil having a stripping bar mounted thereon which is adapted to engage a stop during vertical travel of the anvil to create relative movement therebetween to strip the stock material from the anvil after cutting.

19. An ultrasonic cutting apparatus for rubber stock material comprising,
at least one pressure roller for temporarily securing the stock material to an anvil;
a carriage assembly moveable across the width of the anvil; and
an ultrasonic cutting tool mounted on said carriage assembly;
said cutting tool having a blade mechanically coupled thereto, said blade resonating in response to ultrasonic energy traveling longitudinally therethrough;
said cutting tool also being removably connected to said carriage with a disconnect device, said disconnect device including a plate having a pair of shafts extending outwardly from one side of said plate and extending through bores formed in a tongue attached to said cutting device and through cooperating bores formed in said carriage to maintain the cutting device in supporting relation with said carriage, and a knob extending outwardly from the other side of said plate designed to be grasped to remove the shafts from said bores to quickly remove from or replace said cutting device on said carriage; and
wherein when said carriage assembly moves transversely across said anvil, said blade cuts through and across the stock material.

20. An ultrasonic cutting apparatus for stock material as defined in claim 19, wherein said tongue is integrally attached to a collar extending at least partially around said cutting device.

21. An ultrasonic cutting apparatus for stock material, comprising:
a device for temporarily securing the stock material to an anvil;
a carriage assembly moveable across the width of the anvil; and
an ultrasonic cutting tool mounted on said carriage;
said cutting tool having a blade mechanically coupled thereto, said blade resonating in response to ultrasonic energy traveling longitudinally therethrough;
wherein when said carriage assembly moves transversely across said anvil, said blade cuts through and across the stock material,
and a device slidably engaging the stock material at a location behind said blade to separate the stock material from the anvil after the blade has cut the stock material, said device having a projection slidably moving within a guide channel formed in said anvil.

22. An ultrasonic cutting apparatus for cutting stock material, comprising:
a carriage assembly moveable across the width of an anvil; and
an ultrasonic cutting tool mounted on said carriage;
said cutting tool having a blade mechanically coupled thereto, said blade resonating in response to ultrasonic energy traveling longitudinally therethrough;
a device for temporarily securing the stock material to an anvil in front of said blade, said device for temporarily securing the stock material comprising at least two pressure rollers mounted on said carriage assembly and spring biased into engagement with the stock material to temporarily stitch the stock material to said anvil at a location in front of said blade, wherein one pressure roller applies a general stitching of the stock material to the anvil, and another pressure roller is located between said one pressure roller and said blade and applies a localized stitch of the stock material to the anvil slightly ahead of the travel of the blade across the stock material;

wherein when said carriage assembly moves transversely across said anvil, said blade cuts through and across the stock material, and a device slidably engaging the stock material at a location behind said blade to separate the stock material from the anvil after the blade has cut the stock material, said device having a projection slidably moving within a guide channel formed in said anvil.

* * * * *